US012602914B2

(12) United States Patent
Rakshit et al.

(10) Patent No.: US 12,602,914 B2
(45) Date of Patent: Apr. 14, 2026

(54) PROVIDING USER GUIDANCE TO USE AND TRAIN A GENERATIVE ADVERSARIAL NETWORK

(71) Applicant: INTERNATIONAL BUSINESS MACHINES CORPORATION, Armonk, NY (US)

(72) Inventors: Sarbajit K. Rakshit, Kolkata (IN); Sudhanshu Sekher Sar, Bangalore (IN); Sudheesh S. Kairali, Kozhikode (IN); Satyam Jakkula, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 18/358,375

(22) Filed: Jul. 25, 2023

(65) Prior Publication Data

US 2025/0037442 A1     Jan. 30, 2025

(51) Int. Cl.
  *G06V 10/778*       (2022.01)
  *G06V 10/82*        (2022.01)
(52) U.S. Cl.
  CPC .......... *G06V 10/7788* (2022.01); *G06V 10/82* (2022.01)
(58) Field of Classification Search
  CPC ........................... G06V 10/7788; G06V 10/82
  See application file for complete search history.

(56) References Cited

U.S. PATENT DOCUMENTS

| | | |
|---|---|---|
| 9,953,460 B2 | 4/2018 | Chhugani et al. |
| 11,430,167 B2 | 8/2022 | Zhang |

| | | | |
|---|---|---|---|
| 2021/0117484 A1* | 4/2021 | Sollami | ................ G06F 40/216 |
| 2021/0160018 A1* | 5/2021 | Han | .................... G06Q 20/108 |
| 2021/0259340 A1 | 8/2021 | Clayton | |

(Continued)

FOREIGN PATENT DOCUMENTS

| | | |
|---|---|---|
| EP | 4050515 A1 | 8/2022 |

OTHER PUBLICATIONS

Yang, Chaojie, et al. "Bodygan: General-purpose controllable neural human body generation." Proceedings of the IEEE/CVF Conference on Computer Vision and Pattern Recognition. 2022. (Year: 2022).*

(Continued)

*Primary Examiner* — Utpal D Shah
(74) *Attorney, Agent, or Firm* — Konrad, Raynes, Davda & Victor LLP; David Victor

(57)     ABSTRACT

Provided are a computer program product, system, and method for providing user guidance to use and train a generative adversarial network. A discriminator, implementing machine learning, is trained to output a high probability from input comprising an input image comprising a real image representing a desirable design item superimposed on a body in a pose represented in the input image, a context of the input image and a pose of the body represented in the input image. A generator, implementing machine learning, generates an output image based on an input context, an input pose, and random noise. The discriminator outputs a probability the output image, from the generator, represents a real image having a desirable design item from input comprising the output image, the input context, and the input pose. The generator is trained to output the output image for the input pose and the input context with the probability.

20 Claims, 7 Drawing Sheets

(56) References Cited

U.S. PATENT DOCUMENTS

| | | | | |
|---|---|---|---|---|
| 2021/0358197 | A1* | 11/2021 | Shysheya | G06T 17/10 |
| 2022/0398758 | A1* | 12/2022 | Guo | G06N 3/045 |
| 2024/0118667 | A1* | 4/2024 | Rao | B25J 9/163 |

OTHER PUBLICATIONS

Pandey, Nilesh, and Andreas Savakis. "Poly-GAN: Multi-conditioned GAN for fashion synthesis." Neurocomputing 414 (2020): 356-364. (Year: 2020).*

He, Sen, Yi-Zhe Song, and Tao Xiang. "Style-based global appearance flow for virtual try-on." Proceedings of the IEEE/CVF conference on computer vision and pattern recognition. 2022. (Year: 2022).*

J. Jaykar, et al., "Virtual Trial Room Using 3D Modelling", International Journal of Innovative Research in Science, Engineering and Modelling, vol. 6, Issue 3, Mar. 2017, 6 pp.

N. Zheng, et al., "Virtually Trying on New Clothing with Arbitrary Poses", ACM, 2019, 9 pp.

M. Mirza, et al., "Conditional Generative Adversarial Nets", arXiv, arXiv:1411.1784v1[cs.LG] Nov. 6, 2014, 7 pp.

T. Karras, et al., "A Style-Based Generator Architecture for Generative Adversarial Networks", arXiv, arXiv:1812.04948v3[cs.NE] Mar. 20, 2019, 12 pp.

B. Albahar, et al., "Pose with Style: Detail-Preserving Pose-Guided Image Synthesis with Conditional StyleGAN", arXiv, arXiv:2109.06166v1[cs.CV] Sep. 13, 2021 11 pp.

J. Brownlee, "A Gentle Introduction to StyleGAN the Style Generative Adversarial Network" Machine Learning Mastery, Aug. 19, 2019, 21 pp., [online][retrieved Jun. 3, 2023] https://machinelearningmastery.com/introduction-to-style-generative-ad . . . .

"Background: What is a Generative Model?", Google, 22 pp., [online][retrieved Oct. 8, 2022] https://developers.google.com/machine-learning/gan/generative.

Bharath K, "Complete Guide to Generative Adversarial Networks (GANS)", PaperspaceBlog, 2022, 9 pp.

* cited by examiner

Image File

Training Set

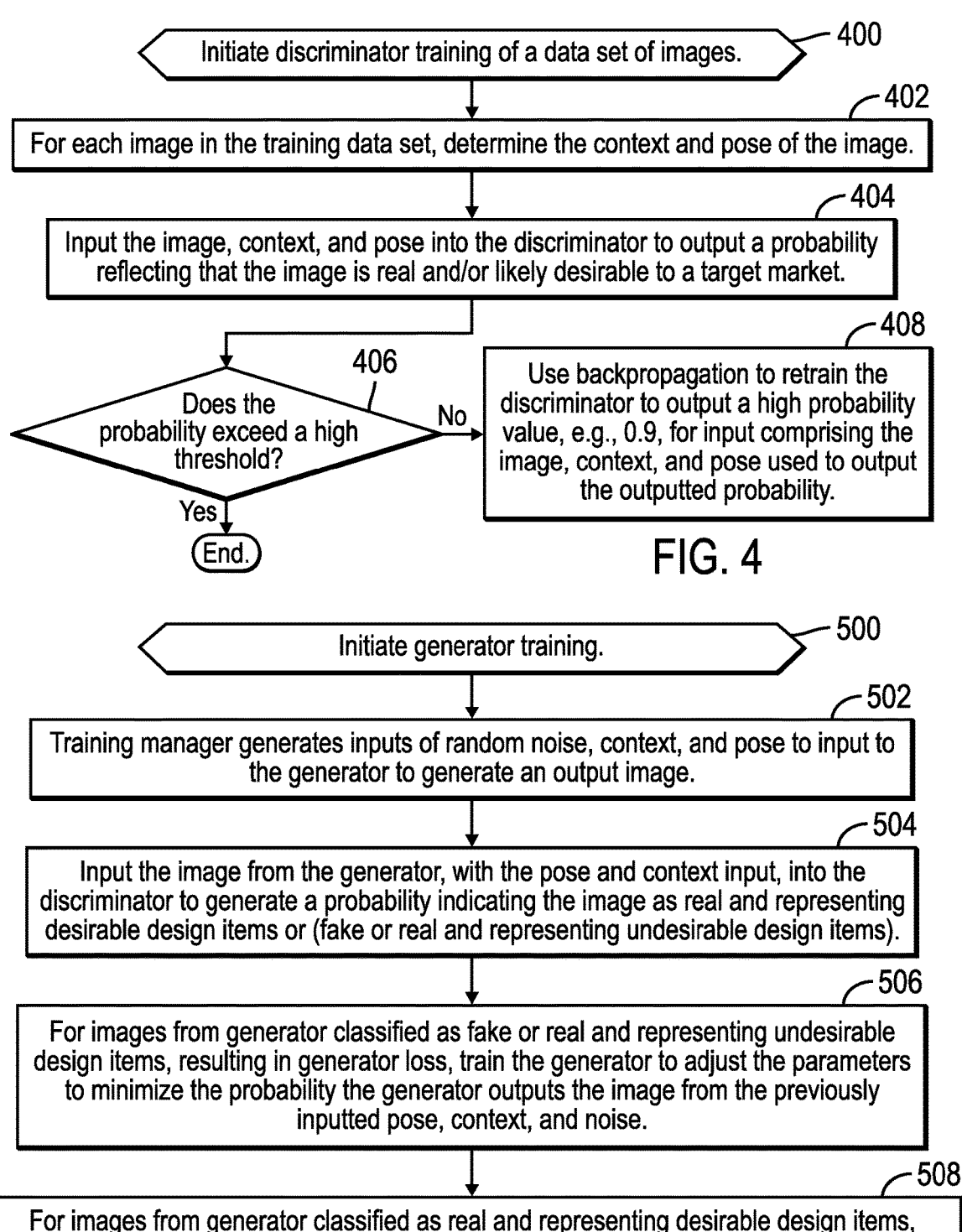

Initiate discriminator training of a data set of images. ⟩—400

For each image in the training data set, determine the context and pose of the image. —402

Input the image, context, and pose into the discriminator to output a probability reflecting that the image is real and/or likely desirable to a target market. —404

406
Does the probability exceed a high threshold?

No

408
Use backpropagation to retrain the discriminator to output a high probability value, e.g., 0.9, for input comprising the image, context, and pose used to output the outputted probability.

Yes

End.

FIG. 4

Initiate generator training. ⟩—500

Training manager generates inputs of random noise, context, and pose to input to the generator to generate an output image. —502

Input the image from the generator, with the pose and context input, into the discriminator to generate a probability indicating the image as real and representing desirable design items or (fake or real and representing undesirable design items). —504

For images from generator classified as fake or real and representing undesirable design items, resulting in generator loss, train the generator to adjust the parameters to minimize the probability the generator outputs the image from the previously inputted pose, context, and noise. —506

For images from generator classified as real and representing desirable design items, train the generator to adjust its parameters to maximize the probability the generator outputs the image the discriminator classifies as real and representing desirable design items. —508

FIG. 5

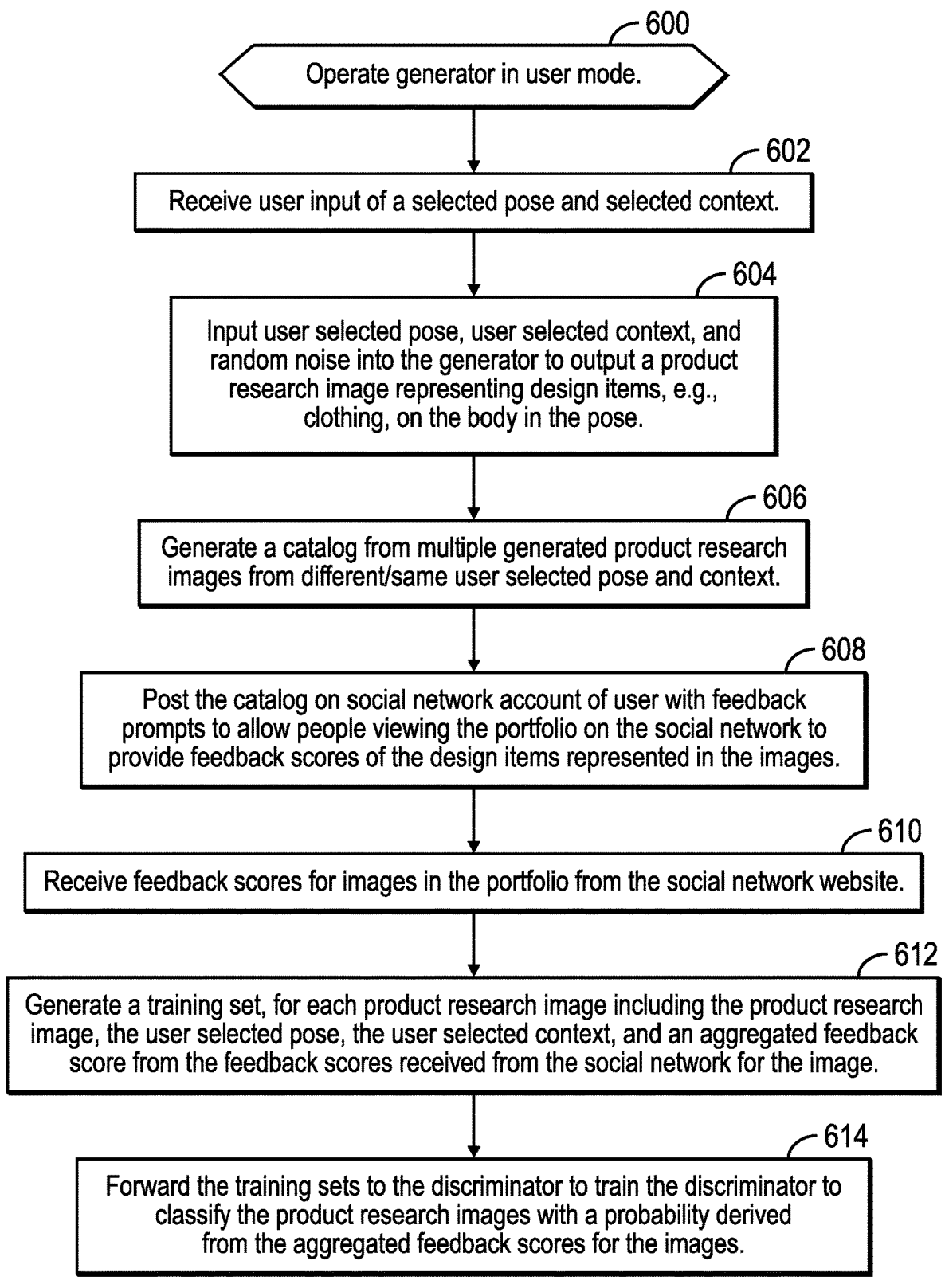

600

Operate generator in user mode.

602

Receive user input of a selected pose and selected context.

604

Input user selected pose, user selected context, and random noise into the generator to output a product research image representing design items, e.g., clothing, on the body in the pose.

606

Generate a catalog from multiple generated product research images from different/same user selected pose and context.

608

Post the catalog on social network account of user with feedback prompts to allow people viewing the portfolio on the social network to provide feedback scores of the design items represented in the images.

610

Receive feedback scores for images in the portfolio from the social network website.

612

Generate a training set, for each product research image including the product research image, the user selected pose, the user selected context, and an aggregated feedback score from the feedback scores received from the social network for the image.

614

Forward the training sets to the discriminator to train the discriminator to classify the product research images with a probability derived from the aggregated feedback scores for the images.

FIG. 6

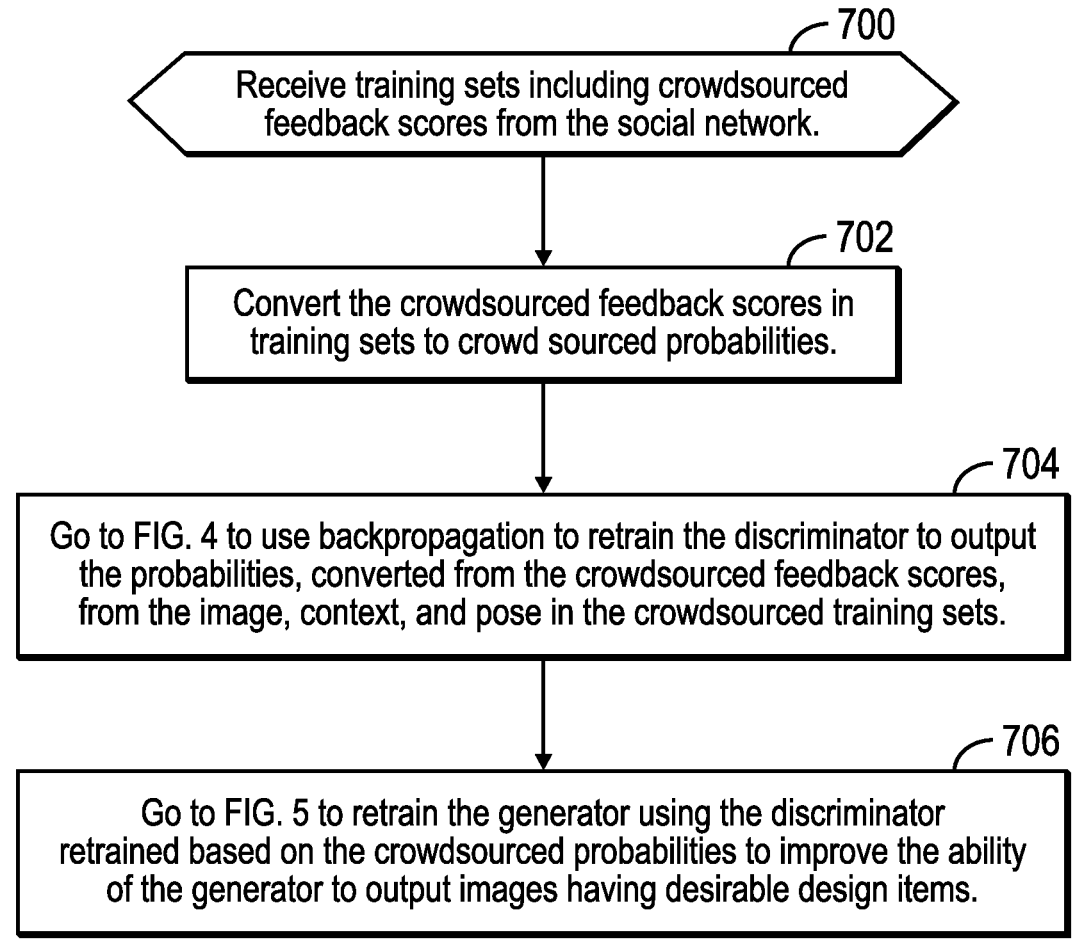

700

Receive training sets including crowdsourced
feedback scores from the social network.

702

Convert the crowdsourced feedback scores in
training sets to crowd sourced probabilities.

704

Go to FIG. 4 to use backpropagation to retrain the discriminator to output
the probabilities, converted from the crowdsourced feedback scores,
from the image, context, and pose in the crowdsourced training sets.

706

Go to FIG. 5 to retrain the generator using the discriminator
retrained based on the crowdsourced probabilities to improve the ability
of the generator to output images having desirable design items.

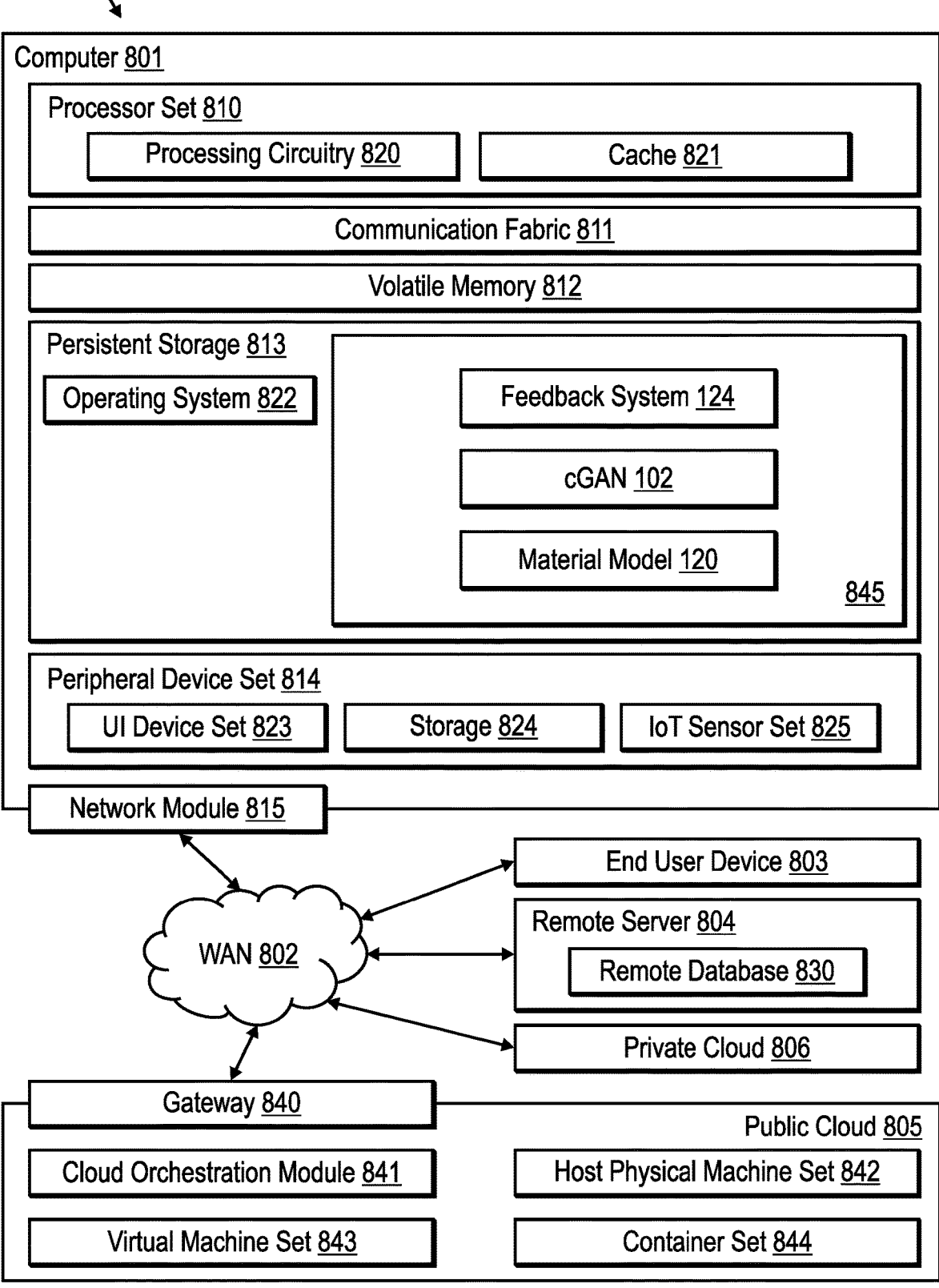

Computer 801

Processor Set 810

Processing Circuitry 820          Cache 821

Communication Fabric 811

Volatile Memory 812

Persistent Storage 813

Operating System 822

Feedback System 124 cGAN 102

Material Model 120

845

Peripheral Device Set 814

UI Device Set 823          Storage 824          IoT Sensor Set 825

Network Module 815

WAN 802

End User Device 803

Remote Server 804

Remote Database 830

Private Cloud 806

Gateway 840

Cloud Orchestration Module 841

Virtual Machine Set 843

Public Cloud 805

Host Physical Machine Set 842

Container Set 844

FIG. 8

PROVIDING USER GUIDANCE TO USE AND TRAIN A GENERATIVE ADVERSARIAL NETWORK

BACKGROUND OF THE INVENTION

1. Field of the Invention

The present invention relates to a computer program product, system, and method for providing user guidance to use and train a generative adversarial network.

2. Description of the Related Art

Generative Adversarial Networks (GAN) are trained to generate realistic images. A style GAN (StyleGAN) is trained to adjust the image via style mixing or a style vector to control the image output to incorporate the style mixing. In a GAN, a discriminator, comprising a machine learning model trained to recognize real images, such as photographs, in a particular domain, classifies output from a generator machine learning model, seeded with random input, as real or fake images. If the generator output is classified as fake, that feedback of the fake result for the output is fed back into the generator using backpropagation to train the generator not to produce that output classified as fake. The generator continually produces output that is classified by the discriminator until a point is reached where the discriminator classifies the generator output as real. For instance, the discriminator may be trained to classify human faces as real or fake from a training set of real human photographs. The generator is trained with the feedback from the discriminator on whether it is outputting realistic facial photographs until a point is reached where the discriminator classifies the generator output facial images as real. In this way, the generator and discriminator in a GAN compete against each other.

A conditional GAN provides additional input to the discriminator and generator, such as a class label, to provide a classification of the data being generated. This allows a condition to be used to control the generator to output a specific type of image and to train the discriminator to classify as real or fake an image of a specific type.

There is a need in the art for improved techniques to train and use a GAN in various use case scenarios.

SUMMARY

Provided are a computer program product, system, and method for providing user guidance to use and train a generative adversarial network. A discriminator, implementing machine learning, is trained to output a high probability from input comprising an input image comprising a real image representing a desirable design item superimposed on a body in a pose represented in the input image, a context of the input image and a pose of the body represented in the input image. The desirable design item comprises a design item determined to be desirable to a target audience. A generator, implementing machine learning, generates an output image based on an input context of a design item to generate, an input pose of a body on which the design item will be superimposed in the output image, and random noise. The discriminator outputs a probability the output image, from the generator, represents a real image having a desirable design item from input comprising the output image, the input context, and the input pose. The generator is trained to output the output image for the input pose and the input context with the probability outputted by the discriminator.

BRIEF DESCRIPTION OF THE DRAWINGS

FIG. 4 illustrates an embodiment of operations to train a discriminator in the cGAN to better classify realistic images representing desirable design items.

FIG. 5 illustrates an embodiment of operations to train the generator in the cGAN.

FIG. 6 illustrates an embodiment of operations to incorporate crowdsourced feedback scores for images generated by the generator to retrain the cGAN.

FIG. 7 illustrates an embodiment of operations to retrain the cGAN based on the crowdsourced feedback scores for images generated by the cGAN.

FIG. 8 illustrates a computing environment in which the components of FIGS. 1A, 1B, and 1C may be implemented.

DETAILED DESCRIPTION

Figure 1A:
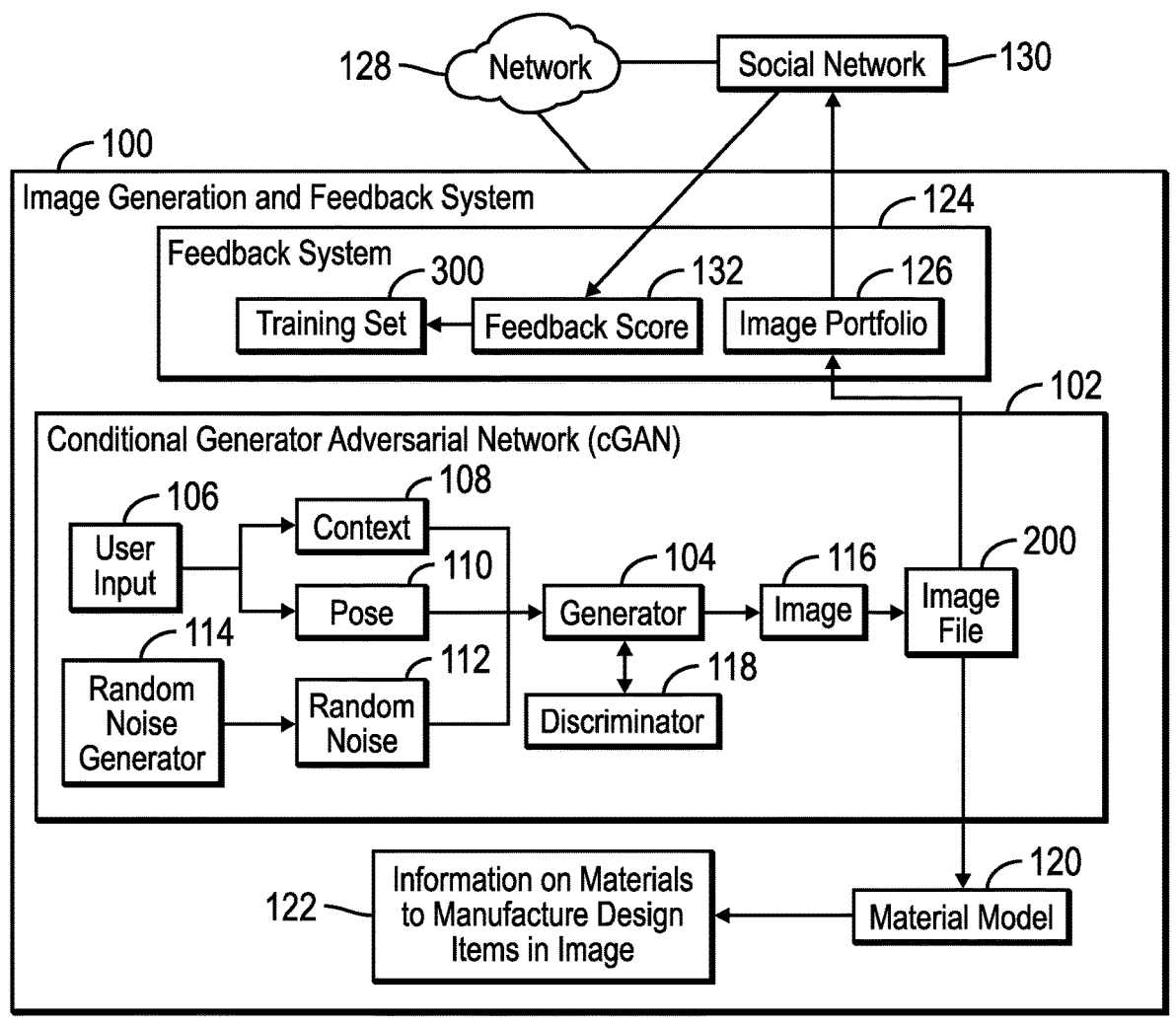
FIGS. 1A, 1B, and 1C illustrate embodiments of an image generation and feedback system including a conditional generative adversarial network (cGAN).

Described embodiments provide improvements to computer technology for a Generated Adversarial Network (GAN) by allowing the user to provide guidance to control the GAN to produce images that represent design items in a user selected pose and context. Further, described embodiments provide techniques for gathering images determined to have a high desirability to a target audience and use that feedback on the design items represented in the images to train the GAN to generate realistic images having desirable design items to a target audience. Described embodiments provide improvements to computer technology to obtain feedback scores from images generated by the GAN to use to further train the GAN discriminator to recognize images representing desirable design items. The discriminator output is then used, in turn, to train the GAN generator to output realistic images representing desirable design items.

FIG. 1 illustrates an embodiment of an image generation and feedback system 100 having a conditional generator adversarial network (cGAN) 102 including a generator 104, implementing a machine learning model, that is trained to receive user input 106 comprising a context 108 and a pose 110 of a body, and random noise 112 from a random noise generator 114, to generate an image 116 with a generated design item superimposed over a body in the pose 110. The generated image 116 may be stored in an image file 200, as shown in FIG. 2, including an image identifier (ID) 202, such as a name of the image 116; a context 204, such as context 108; a pose 206, such as pose 110; and image content 208 comprising the image 116 generated by the generator 104. The embodiment of FIG. 2 is advantageous for computational processing operations because the image file 200 has metadata of the context 204 and pose 206 of the generated image 208 that may later be used to form a training set 300, shown in FIG. 3, to train the generator 104 and discriminator 402 as part of a conditional GAN, or cGAN.

The generated design items represented in the image 116 may comprise articles of clothing superimposed over the body in the pose 110 or accessories adorning the person in the pose 110, such as clothes, shoes, handbags, hats, head coverings, jewelry, accoutrements, etc. The context 108 may comprise one or more classifications of a context 108 of the image for the generator 104 to generate, including, without limitation, an activity in which the body in the pose 110 is engaged, a style of design items to be superimposed over the body in the pose 110, an environment in which the design items are to be worn, e.g., formal wear, exercise, casual, beach ware, demographics of a person that would utilize the design items, such as age, region, etc., a cultural milieu in which the design items would be presented (e.g., rancher, youth culture, retirement, hipster, urban, rural, beach life, high society, etc.). The pose 110 may comprise a mask showing positions of body keypoints that represent a pose on which the design items will be superimposed.

The cGAN c102 includes a discriminator 118, implementing a machine learning model, that is trained to classify received input images, such as images representing a body in a pose with design items superimposed over the body, as real images of desirable design items. The discriminator 118 outputs a probability/confidence level the input image 116 is a real image of design items superimposed or worn on a body in a pose and the represented design items are desirable to the target market of the design items. The discriminator 118 may be trained with a labeled data set of real images of people in poses, adorned with design items that have been determined through market research to be desirable to target markets, to output a high probability for real images with desirable design items to the target market and output a low probability for fake images or real images with design items determined to be undesirable or of low interest to the target market. The discriminator 118 may be trained by the developer of the GAN 102 before distributing to users and may also be trained during operations while deployed in a user system 102 on data sets including images generated by the generator 104 and feedback on the images, such as feedback gathered during marketing research.

A material model 120, comprising a machine learning model, may be trained to receive as input the images 116 including their context and pose, and generate information on materials 122 that may be most suitable to manufacture the design items based on the context 108. The material model 120 may receive as input the image file 200 including the generated image 116, context 108, and pose 110 to generate the information on materials 122 to use to manufacture the design items represented in the generated image 116.

The output image 116 from the generator 104 may further be sent to a feedback system 124 which may assemble multiple images 116 into an image portfolio 126 comprising one or more images 116 of design items superimposed over bodies in the user provided pose 110 and context 108. The portfolio 126 may be transmitted over a network 128, such as the Internet, to post on a social network 130, including a metaverse or online virtual reality community, to be presented to a target market that would most likely be interested in the design items represented in the images 116 in the portfolio 126. Viewers of the portfolio 126 on the social network 130 may provide feedback, such as a feedback score 132, indicating the extent to which the users of the social network 130 approve or desire the design items represented in the images 116, or are uninterested or disapprove of the design items represented in the images 116. The feedback system 124 may generate a training set 300 comprising the image 116 for which feedback is provided, the context 108 and pose 110 used to generate the image 116, and the feedback score 132 to provide to the discriminator 118 that trains the generator 104. In this way, the feedback system 124 engages in product market research, by generating product research images of prospective design items, generated by the cGAN 102, to post on a social network 130 to receive crowdsourced feedback on the desirability of the product research images.

Figure 3:
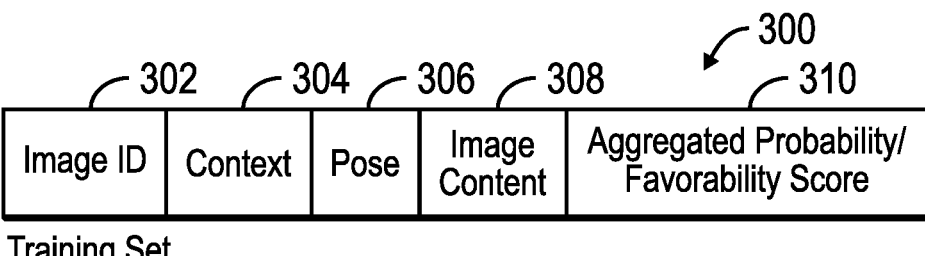
FIG. 3 illustrates an embodiment of a training set including a crowdsourced feedback score to train the cGAN to improve image output.

FIG. 3 is an embodiment of a training set 300 that includes an image ID 302 of an image that will be used to train the discriminator 118; context 304 of the image 302; a pose 306 of a body represented in an image; image content 308; and a probability (confidence level) or favorability score 310 at which the generator 104 and discriminator 118 should generate the image.

Figures 1B, 1C:
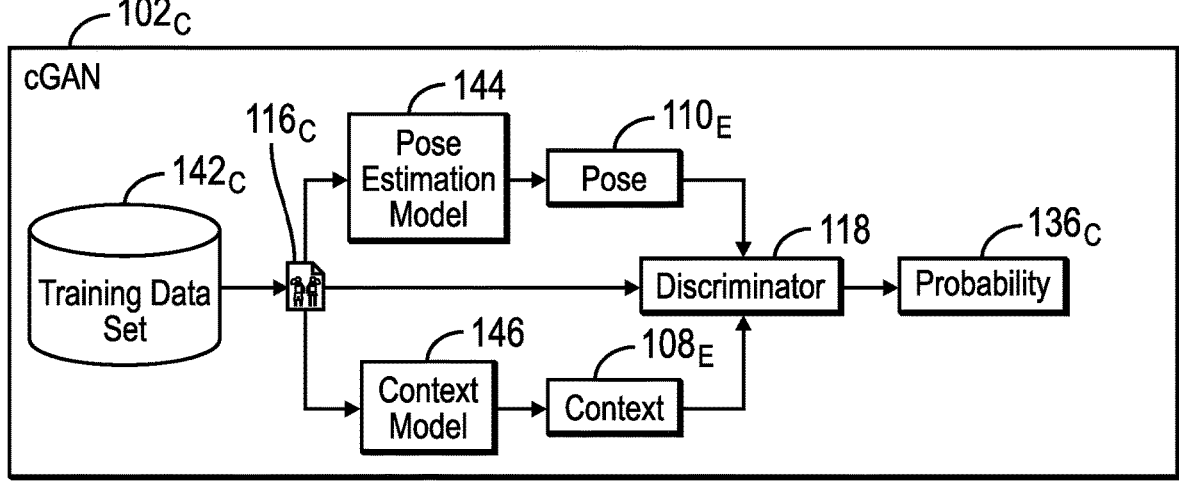
Figure 2:
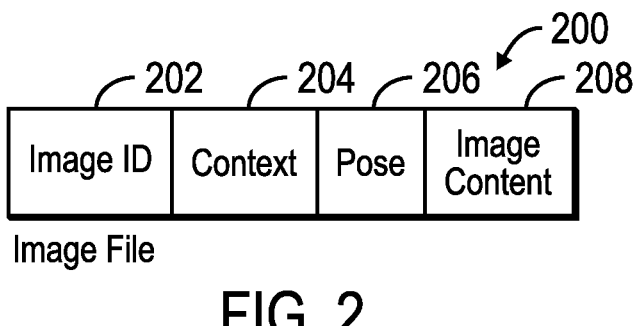
FIG. 2 illustrates an embodiment of an image file including an image generated by the cGAN and metadata thereon.

FIG. 1B illustrates an embodiment of the training process implemented in the cGAN 102 with the generator 104 and discriminator 118 described with respect to FIG. 1A. A training manager 134, used to train the generator 104, generates, for training purposes, a pose 110$_T$ and context 108$_T$ and random input 112$_T$, from a random generator, to seed the generator 104 to produce a training image 116$_T$. The generator 104 generates a training image 116$_T$ that is included in a training image file 200$_T$ and sent to the discriminator 118. The discriminator 118 processes the training image 116$_T$ and training context 108$_T$ and training pose 110$_T$, from which the training image 116$_T$ was generated, and outputs a probability 136 indicating the extent to which the training image 116$_T$ is real, such as from a photo, and likely desirable to a target audience or is fake or real and not likely desirable to a target audience. If the training images 116$_T$ are classified as fake or real and not desirable, then that is a generator loss 138 because the generator 104 was unable to generate an image that would trick the discriminator 118 into classifying the training image 116$_T$ as real and desirable. This generator loss 138 would trigger the generator 104 to retrain and adjust its weights and parameters to output the training image 116$_T$ with context 108$_T$ and pose 110$_T$ with a low probability/confidence level.

The probability 136 may comprise a confidence level indicating a degree of confidence, such as a percentage, in the prediction of whether the input image is real and has design items desirable to a prospective market. Discriminator 118 may be trained to output a probability 136, i.e., confidence level, for real and desirable images that is set to a relatively high value such as 80%. A confidence level, confidence interval or confidence score may comprise a number between 0 and 1, or other numerical range or fixed number of levels (e.g., high, medium or low), that represents the likelihood that the output of the discriminator 118 correctly predicts an image as real and having desirable design items. The confidence level comprises a margin of error in the cost function of the probability 136 and a ground truth probability or feedback score 132 assigned to the images in the training image dataset 142, such that if the feedback score 132 is high, e.g., 95%, indicating high desirability of a real design item, then the discriminator 118 is trained to produce the probability 136 with a margin of error within 5%.

If the training image 116$_T$ is classified as real, then that is a discriminator loss 140 because the discriminator 118 was unable to discern the image 116$_T$ as fake from the generator 104. This discriminator loss 140 may trigger the discriminator 118 to retrain and adjust its weights and parameters to output the training image 116$_T$ with a low confidence level or probability, which would indicate it is fake.

Further, the discriminator 118 may be trained in a user deployed cGAN 102 or by the vendor on a training data set 142 including historical training sets 300$_H$ of images determined to be real and represent desirable items. The training data set 142 may further comprise feedback training sets 300$_F$ generated by the feedback system 124 that indicates the result of marketing research by posting the images 116 from the generator 104 on a social network 130 website. Data set training images 116$_{DS}$, from the data set 142, along with an accompanying context 108$_{DS}$ and pose 110$_{DS}$ of the data set image 116$_{DS}$ are inputted into the discriminator 118 to produce a training probability 136$_{DS}$ for the data set and a discriminator loss 140, if any, that is backpropagated through the discriminator 118 to retrain the discriminator 118 to output the training data set image 116$_{DS}$ with a probability provided with the training set 300$_H$, 300$_F$ in the data set 142.

FIG. 1C illustrates an alternative embodiment of the cGAN 102 in FIG. 1B as cGAN 102$_C$ where the pose and context are not included in the training data set 142 training sets 300. This would often be the case because obtaining labeled data sets may be difficult. In such case, where the pose and context are not provided with the training data sets 300 in data set 142$_C$, cGAN 102$_C$ includes a pose estimation model 144, implementing machine learning, to process the image 116$_C$ and output an estimated pose 110$_E$ of a body represented in the image 116$_C$. The cGAN 102$_C$ further includes a context model 146, implementing machine learning, to process the image 116$_C$ and output an estimated context 108$_E$. The estimated pose 110$_E$, estimated context 108$_E$, and the image 116$_C$ are then inputted into the discriminator 118 to output a probability 136$_C$ the image is real and desirable, such as if the input images 116$_C$ have desirable design items, with a high probability value, as described above with respect to FIG. 1B.

In certain embodiments, the cGAN 102 may comprise a style based GAN, such as StyleGAN, which offers control over the style of the generated image. The discriminator 118 may comprise a classification neural network. In certain embodiments, many of the described components, such as the generator 104, discriminator 118, material model 120, pose estimation model 144, and context model 146 may use machine learning and deep learning algorithms, such as decision tree learning, association rule learning, neural networks, inductive programming logic, support vector machines, Bayesian network, recurrent neural networks (RNN), Feedforward neural networks, Convolutional Neural Networks (CNN), Deep Convolutional Neural Networks (DCNNs), Generative Adversarial Network (GAN), Conditional GAN (cGAN), etc. For artificial neural network program implementations, the neural network may be trained using backward propagation to adjust weights and biases at nodes in a hidden layer to produce their output based on the received inputs. In backward propagation used to train a neural network machine learning module, biases at nodes in the hidden layer are adjusted accordingly to produce the expected output having specified confidence levels based on the input parameters.

Backward propagation may comprise an algorithm for supervised and semi-supervised learning of artificial neural networks using gradient descent. Given an artificial neural network and an error function, the method may use gradient descent to find the parameters (coefficients) for the nodes in a neural network or function that minimizes a cost function measuring the difference or error between actual and predicted values for different parameters. The parameters are continually adjusted during gradient descent to minimize the error.

In backward propagation used to train a neural network machine learning module, margins of error are determined based on a difference of the calculated predictions and user rankings of the output. Biases (parameters) at nodes in the hidden layer are adjusted accordingly to minimize the margin of error of the error function.

In an alternative embodiment, other techniques may be used to train the components, such as an unsupervised machine learning module, or machine learning implemented in methods other than neural networks, such as multivariable linear regression models.

The network 128 may comprise a network such as a Storage Area Network (SAN), Local Area Network (LAN), Intranet, the Internet, wireless network, broadband network, satellite network, etc.

The arrows shown in FIGS. 1A, 1B, and 1C between the components and objects represent a data flow between the components.

Generally, program modules, such as the program components 102, 102c, 104, 114, 118, 120, 124, 144, 146, among others, may comprise routines, programs, objects, components, logic, data structures, and so on that perform particular tasks or implement particular abstract data types. The program components and hardware devices of the system 100 and GANs 102, 102$_c$ of FIGS. 1A, 1B, and 1C may be implemented in one or more computer systems, where if they are implemented in multiple computer systems, then the computer systems may communicate over a network.

The program components 102, 102c, 104, 114, 118, 120, 124, 144, 146, among others, may be accessed by a processor from memory to execute. Alternatively, some or all of the program components 102, 102c, 104, 114, 118, 120, 124, 144, 146, among others, may be implemented in separate hardware devices, such as Application Specific Integrated Circuit (ASIC) hardware devices and accelerator engines.

The functions described as performed by the program 102, 102c, 104, 114, 118, 120, 124, 144, 146, among others, may be implemented as program code in fewer program modules than shown or implemented as program code throughout a greater number of program modules than shown.

The image generation and feedback system 100 may comprise a server or other type of computing device, such as a laptop, desktop computer, tablet, smartphone, wearable computer, etc.

FIG. 4 illustrates an embodiment of operations performed by components in the cGAN 102, 102c to train the discriminator 118. Upon initiating (at block 400) a discriminator 118 training phase to train the discriminator on training sets 300 in a training data set 142, 142$_C$, for each image in the training data set 142, 142$_C$, the cGAN 102, 102c determines (at block 402) the context 108$_{DS}$. 108$_E$ and pose 110$_{DS}$. 110$_E$ of the image 116$_T$. 116$_C$. In the embodiment of FIG. 1B, the context 108$_{DS}$ and pose 110$_{DS}$ may be included with metadata for the training image 116$_{DS}$. In the embodiment of FIG. 1C, the pose estimation model 144 and context model 146 may process the training image 116$_C$ and output an estimated pose 110$_E$ and estimated context 108$_E$, respectively.

The training image 116$_T$, 116$_C$, context 108$_{DS}$, 108$_E$ and pose 110$_{DS}$, 110$_E$ are inputted (at block 404) into the discriminator 118 to output a probability 136, 136$_C$ reflecting that the image is real and likely desirable to a target market. If (at block 406) the probability exceeds a high threshold, e.g., 90%, then control ends as the discriminator

118 has accurately predicted the training set image as real and representing desirable items. If the training image in the training data set 142, 142$_C$ was produced with a low probability, indicating it was fake or real and not desirable, then the discriminator 118 would be trained to output a low probability 136, 136$_C$. If (at block 406) the probability does not exceed the high threshold, for real/desirable images, or low for fake or real/desirable images, then the cGAN 102, 102$c$ may use (at block 408) backpropagation to retrain the discriminator 118 to output a high probability value, e.g., 0.9, for input comprising a real image representing desirable design items.

With the embodiment of FIG. 4, an improved cGAN training technique is provided to train a discriminator 118 to recognize images based on conditional information, such as context and pose, that are real and represent desirable design items based on feedback obtained by a feedback system 124.

FIG. 5 illustrates an embodiment of operations performed by components in the cGAN 102, as described with respect to FIG. 1B, to train the generator 104. Upon initiating (at block 500) operations to train the generator 104, the training manager 134 generates (at block 502) inputs of random noise 112, context 108$_T$, and pose 110$_T$ to input to the generator 104 to generate an output image 116$_T$. The training manager 134 inputs (at block 504) the output image 116$_T$, from the generator 104, along with the context 108$_T$, and pose 110 input, into the discriminator 118 to generate the probability 136 indicating the image 116$_T$ as real and representing desirable design items or one of fake and real representing undesirable design items. For images 116$_T$ from the generator 104 classified as fake or real representing undesirable design items, resulting in generator loss 138, the training manager 134 trains (at block 506) the generator 104, using backpropagation, to adjust the parameters to minimize the probability the generator outputs the image, which is fake or real representing undesirable design items, from the previously inputted pose 110$_T$ and context 108$_T$, and noise 112$_T$. For images 116$_T$ from the generator 104 the discriminator 118 classifies as real and representing desirable design items, the training manager 134 trains (at block 508) the generator 104 to adjust its parameters to maximize the probability the generator outputs the image 116$_T$ the discriminator classifies as real and representing desirable design items from the previously inputted pose 110$_T$ and context 108$_T$, and noise 112$_T$.

With the embodiment of FIG. 5, the cGAN 102 trains the generator 104 to output real images representing desirable design articles based on the pose 110$_T$ and context 108$_T$ of an image 116$_T$ to generate. Further, generator loss 138 from the discriminator 118 is used to adjust the generator 104 output when it does not produce images 116$_T$ that the discriminator classifies as fake or real images representing desirable design items. This provides improvements to computer technology for generating images having design items that will be desirable to a target market.

FIG. 6 illustrates an embodiment of operations performed by the cGAN 102 and feedback system 124 to operate the generator 104, as shown in FIG. 1A, in a user mode to generate images representing design items to present to a prospective market to obtain feedback. Upon operating (at block 600) the generator 104 in user mode, the cGAN 102 receives user input 106 of a selected context 108 and pose 110 to incorporate into the image 116 to generate. The user selected context 108 and pose 110 may be expressed in a semantic or pictorial format in human understandable form. The human understandable pose 110 and context 108 may be translated to a computer readable vector or mask. The cGAN

102 inputs (at block 604) the user selected context 108 and pose 110, which may have been translated to a vector or format suitable for processing by the generator 104, and noise 112 into the generator 104 to output the image 116 representing design items, e.g., clothing, on the body in the pose. The feedback system 124 may generate (at block 606) a catalog 126 of one or more generated images 116 for the same or different poses and contexts. The catalog 126 may be in digital format.

The feedback system 124 may post (at block 608) the catalog 126 on a social network account of the user of the system 102 with feedback prompts to allow people viewing the portfolio images on the social network 130 to provide a feedback score 132 of the design items represented in the images. The feedback score 132 for a particular image indicates the extent the user desired or was positively disposed to the design item represented in the image 116. Upon receiving (at block 610) feedback scores 132 for the images in the portfolio 126, the feedback system 124 generates (at block 612) training sets 300, where each training set 300 includes the context 108, pose 110, image content 116, and an aggregated feedback score, from the different received feedback scores 132 for the image 116, in fields 304, 306, 308, and 310, respectively, of the training set 300. The feedback system 124 forwards (at block 614) the generated training set 300 to the discriminator 118, shown in FIG. 1B, to train the discriminator to classify the image with a probability derived from the aggregated feedback score 310.

With the embodiment of FIG. 6, the system 102 may be used to initiate a marketing research campaign for the user to obtain feedback on design items, e.g., clothing and accessories, represented in the images, generated by the generator 104, to determine design items that are desirable to specific marketing segments, based on the contexts of the images, to then select for manufacturing and sale. Described embodiments integrate a cGAN 102 to generate images representing desirable design items based on user selected context and pose and post the images on a social network site to obtain crowdsourced feedback from the social network 130. This crowdsourced feedback may be used to further train the cGAN 102 to output realistic images representing desirable design items.

FIG. 7 illustrates an embodiment of operations performed by the cGAN 102 of FIGS. 1A and 1B to retrain the generator 104 and discriminator 118 based on the crowdsourced feedback scores 132 in the training sets 300. Upon the cGAN 102 receiving (at block 700) training sets 300 from the feedback system 124 including crowdsourced aggregated feedback scores 132 from the social network 130, the cGAN 102 may convert (at block 702) the crowdsourced aggregated feedback scores 132 in the training sets 300 to crowdsourced probabilities 136. The cGAN 102 performs the operations of FIG. 4 (at block 704) to use backpropagation to retrain the discriminator 118 to output the probabilities 136, converted from the crowdsourced feedback scores 132, from the image 308, context 304, and pose 306 in the crowdsourced training set 300$s$. The cGAN 102 performs the operations of FIG. 5 (at block 706) to retrain the generator 104 using the discriminator, retrained at step 704 based on the crowdsourced probabilities 136, to improve the ability of the generator 104 to output realistic images having desirable design items.

With the embodiment of FIG. 7, the discriminator 118 is retrained to output the images with the crowdsourced probabilities from the crowdsourced feedback scores 132 from the social network 130. The discriminator 118 is trained to output a low probability/feedback score indicating the design items are not desirable to the target market or high indicating the design articles are desirable. Further, generator 104 is retrained to output images representing desirable design items as determined from crowdsourced feedback scores 132 from a social network 130.

In the described embodiments, the design items comprised clothing, accessories, shoes, jewelry, and other articles a person wears. In alternative embodiments, the design items may comprise design items a person wants to purchase unrelated to clothing, such as artwork, automobiles, furniture, smartphones, non-fungible tokens (NFTs), computers, etc., and the context and pose may be appropriate to the design item.

In further embodiments, a video and image analysis module may be used to identify different poses in video and images the user may select for input to the generator 104. In further embodiments, a pose estimation model may analyze videos to create a series of poses with stick figures to use as the input pose 110 to the generator 104. Further embodiments may identify stick figure poses to classify based on different types of activities performed by different types of users. Still further, the stick figure poses may be classified based on demographic, location, and the purpose of usage. The extracted information on poses may then be provided as input to the GAN to enable the GAN to create different types of design items having different styles and designs.

In further embodiments, the training data set 142 may be gathered from images of existing fashion item stocks, and their usage, and sentiments on the fashion items from social network sites. Once the generator generates simulated fashion items, then the feedback system 124 will present assemble the generated fashion items appear, with different poses and activities, to create a fashion photography portfolio for different types of fashion items represented in the generator 104 generated images 116. The images 116 of GAN generated fashion items with different poses are posed on the social network sites to gather public sentiments, and to allow further adjustment of design items represented in further generated images before a final design is created, or sent to the material model for manufacturing specifications. This allows crowdsourcing to train the cGAN generator 104 by having participants of a social network 130, such as a metaverse, review the fashion portfolio in order to garner feedback from the participants about the fashion items, and the same will be used to retrain the discriminator 118 to further refine the generator to refine the generated fashion items.

In further embodiments, for the material model 120, a pose estimation model may analyze the poses and the activities in different images to identify types of forces applied on different fashion items while performing different activities and to identify different applied forces on different sides of the fashion item during usage, as part of determining the materials 122 to use to manufacture the design items represented in the images 116.

In further embodiments, the generator 104 may receive additional conditional inputs, including pre-defined rules, to generate the image 116 for different types of fashion items. The pre-defined rules may comprise different types of guideline, such as color, material used, size, dimension related information etc.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 8 illustrates computing environment 800 providing an example of an environment for the execution of at least some of the computer code involved in performing the inventive methods to generate realistic images representing desirable design items superimposed on a body in a pose in block 845, including the feedback system 124, cGAN 102, and material model 120 described above with respect to FIGS. 1A, 1B, and 1C. In addition to block 845, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 845 as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 845 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 845 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on. The EUD 803 may represent a device used by a user of the social network 130 website to provide feedback scores 132 to portfolios 126 posed on the social network 130 website.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804. In described embodiments, the remote server 804 may comprise the social network 130 website.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for providing user guidance to use and train a generative adversarial network, the computer program product comprising a computer readable storage medium having computer readable program code embodied therein that is executable to perform operations, the operations comprising:

training a discriminator, implementing machine learning, to output a high probability from input comprising an input image comprising a real image representing a desirable design item superimposed on a body in a pose represented in the input image, metadata of a context of the input image, and metadata of the pose of the body represented in the input image, wherein the metadata of the pose indicates positions of body keypoints that represent the pose on which the desirable design item will be superimposed, wherein the desirable design item comprises a design item desirable to a target audience;

executing a generator, implementing machine learning, to generate an output image based on an input context of a design item to generate, an input pose of a body on which the design item will be superimposed in the output image, and random noise;

outputting, by the discriminator, a probability the output image, from the generator, represents a real image having a desirable design item from input comprising the output image, the input context, and the input pose; and training the generator to output the output image for the input pose and the input context with the probability outputted by the discriminator.

2. The computer program product of claim 1, wherein the operations further comprise:

generating, during training, by a computer process, input sets, wherein an input set includes a training pose, a training context, and random nose; and inputting the input sets into the generator during training to generate training output images for the input sets, wherein each output image is inputted into the discriminator with the training pose and the training context used to generate the training output images to determine probabilities the output images comprise real images representing desirable design items.

3. The computer program product of claim 1, wherein the training the discriminator comprises:

providing a training data set of training images that have been labeled as desirable to the target audience, wherein the training images represent bodies clad with design items;

inputting the training images into a pose estimation model to determine poses of bodies represented in the training images; and inputting the training images into a context model to determine contexts for the training images, wherein the discriminator is trained to output the high probability for input comprising the training images, the determined poses, and the determined contexts.

4. The computer program product of claim 1, wherein the operations further comprise:

receiving a user selected pose and a user selected context in human understandable form;

converting the user selected pose and the user selected context to a converted pose and a converted context, respectively; and inputting the user selected pose and the user selected context to the generator to generate the output image.

5. The computer program product of claim 1, wherein the operations further comprise:

inputting the output image, the pose, and the context used to generate the output image into a materials model, implementing machine learning, to output materials to use to manufacture the design item represented in the output image.

6. The computer program product of claim 1, wherein the operations further comprise:

inputting a user selected pose and a user selected context into the generator to generate a product research image representing a design item superimposed onto a body in the user selected pose;

posting the product research image onto a social network; and receiving feedback scores from the social network indicating desirability ratings of the posted product research image, wherein the discriminator and the generator are trained based on the product research image, the user selected context, the user selected pose, and an aggregated feedback score from the received feedback scores for the posted product research image.

7. The computer program product of claim 6, wherein the operations further comprise:

generating, with the generator, a plurality of product research images from multiple instances of user selected poses and user selected contexts; and arrange the product research images in a portfolio to publish on the social network to receive feedback scores for the plurality of product research images, wherein the generator and the discriminator are trained from the product research images, the user selected contexts, the user selected poses, and aggregated feedback scores for the product research images.

8. The computer program product of claim 6, wherein the training the discriminator further comprises:

determining whether the aggregated feedback score indicates that the design item represented in the product research image is desirable or not desirable to reviewers on the social network, wherein the training the discriminator comprises training the discriminator to output the high probability from input comprising the product research image, the user selected context, and the user selected pose in response to the aggregated feedback score indicating that the design item in the product research image is desirable; and training the discriminator to output a low probability from input comprising the product research image, the user selected context, and the user selected pose in response to the aggregated feedback score indicating that the design item in the product research image is not desirable.

9. The computer program product of claim 6, wherein the training the generator further comprises:

training the generator to output the posted product research image with the high probability for inputs comprising the user selected context and the user selected pose in response to the aggregated feedback score from the social network indicating a high desirability of the design item in the posted product research image; and training the generator to output the posted product research image with a low probability for inputs comprising the user selected context and the user selected pose in response to the aggregated feedback score from the social network indicating a low desirability of the design item in the posted product research image.

10. The computer program product of claim 1, wherein the metadata of the pose comprises a pose mask of the body keypoints, wherein the metadata of the context indicates demographics of a person represented in the input image and the output image in the pose, a style of design items superimposed over the body of the person in the pose, and an environment in which the person is situated.

11. A system for providing user guidance to use and train a generative adversarial network, comprising:

a discriminator;

a generator;

a computer readable storage medium having computer readable program code embodied therein that is executable to perform operations, the operations comprising:

training the discriminator, implementing machine learning, to output a high probability from input comprising an input image comprising a real image representing a desirable design item superimposed on a body in a pose represented in the input image, metadata of a context of the input image, and metadata of the pose of the body represented in the input image, wherein the metadata of the pose indicates positions of body keypoints that represent the pose on which the desirable design item will be superimposed, wherein the desirable design item comprises a design item desirable to a target audience;

executing the generator, implementing machine learning, to generate an output image based on an input context of a design item to generate, an input pose of a body on which the design item will be superimposed in the output image, and random noise;

outputting, by the discriminator, a probability the output image, from the generator, represents a real image having a desirable design item from input comprising the output image, the input context, and the input pose; and training the generator to output the output image for the input pose and the input context with the probability outputted by the discriminator.

12. The system of claim 11, wherein the operations further comprise:

generating, during training, by a computer process, input sets, wherein an input set includes a training pose, a training context, and random nose; and inputting the input sets into the generator during training to generate training output images for the input sets, wherein each output image is inputted into the discriminator with the training pose and the training context used to generate the training output images to determine probabilities the output images comprise real images representing desirable design items.

13. The system of claim 11, wherein the training the discriminator further comprises:

providing a training data set of training images that have been labeled as desirable to the target audience, wherein the training images represent bodies clad with design items;

inputting the training images into a pose estimation model to determine poses of bodies represented in the training images; and inputting the training images into a context model to determine contexts for the training images, wherein the discriminator is trained to output the high probability for input comprising the training images, the determined poses, and the determined contexts.

14. The system of claim 11, wherein the operations further comprise:

inputting a user selected pose and a user selected context into the generator to generate a product research image representing a design item superimposed onto a body in the user selected pose;

posting the product research image onto a social network; and receiving feedback scores from the social network indicating desirability ratings of the posted product research image, wherein the discriminator and the generator are trained based on the product research image, the user selected context, the user selected pose, and an aggregated feedback score from the received feedback score for the posted product research image.

15. The system of claim 14, wherein the training the generator further comprises:

training the generator to output the posted product research image with the high probability for inputs comprising the user selected context and the user selected pose in response to the aggregated feedback score from the social network indicating a high desirability of the design item in the posted product research image; and training the generator to output the posted product research image with a low probability for inputs comprising the user selected context and the user selected pose in response to the aggregated feedback score from the social network indicating a low desirability of the design item in the posted product research image.

16. A method for providing user guidance to use and train a generative adversarial network, comprising:

training a discriminator, implementing machine learning, to output a high probability from input comprising an input image comprising a real image representing a desirable design item superimposed on a body in a pose represented in the input image, metadata of a context of the input image, and metadata of the pose of the body represented in the input image, wherein the metadata of the pose indicates positions of body keypoints that represent the pose on which the desirable design item will be superimposed, wherein the desirable design item comprises a design item desirable to a target audience;

executing a generator, implementing machine learning, to generate an output image based on an input context of a design item to generate, an input pose of a body on which the design item will be superimposed in the output image, and random noise;

outputting, by the discriminator, a probability the output image, from the generator, represents a real image having a desirable design item from input comprising the output image, the input context, and the input pose; and training the generator to output the output image for the input pose and the input context with the probability outputted by the discriminator.

17. The method of claim 16, further comprising:

generating, during training, by a computer process, input sets, wherein an input set includes a training pose, a training context, and random nose; and inputting the input sets into the generator during training to generate training output images for the input sets, wherein each output image is inputted into the discriminator with the training pose and the training context used to generate the training output images to determine probabilities the output images comprise real images representing desirable design items.

18. The method of claim 16, wherein the training the discriminator further comprises:

providing a training data set of training images that have been labeled as desirable to the target audience, wherein the training images represent bodies clad with design items;

inputting the training images into a pose estimation model to determine poses of bodies represented in the training images; and inputting the training images into a context model to determine contexts for the training images, wherein the discriminator is trained to output the high probability for input comprising the training images, the determined poses, and the determined contexts.

19. The method of claim 16, further comprising:

inputting a user selected pose and a user selected context into the generator to generate a product research image representing a design item superimposed onto a body in the user selected pose;

posting the product research image onto a social network; and receiving feedback scores from the social network indicating desirability ratings of the posted product research image, wherein the discriminator and the generator are trained based on the product research image, the user selected context, the user selected pose, and an aggregated feedback score from the received feedback score for the posted product research image.

20. The method of claim 19, wherein the training the generator further comprises:

training the generator to output the posted product research image with the high probability for inputs comprising the user selected context and the user selected pose in response to the aggregated feedback score from the social network indicating a high desirability of the design item in the posted product research image; and training the generator to output the posted product research image with a low probability for inputs comprising the user selected context and the user selected pose in response to the aggregated feedback score from the social network indicating a low desirability of the design item in the posted product research image.

* * * * *